United States Patent [19]

Meyer

[11] 3,871,430

[45] Mar. 18, 1975

[54] RETAINER CLIP
[75] Inventor: Engelbert A. Meyer, Union Lake, Mich.
[73] Assignee: USM Corporation, Boston, Mass.
[22] Filed: Oct. 26, 1973
[21] Appl. No.: 410,037

[52] U.S. Cl. .................... 151/41.75, 85/80, 85/5 R
[51] Int. Cl. ........................................... F16b 21/00
[58] Field of Search ............. 85/5 R, 80; 151/41.75; 24/73 MF

[56] References Cited
UNITED STATES PATENTS

| 2,160,353 | 5/1939 | Conners | 151/41.75 |
| 2,244,975 | 6/1941 | Tinnerman | 85/5 R |
| 2,629,157 | 2/1953 | O'Herron | 85/5 R |
| 2,667,200 | 1/1954 | Bedford | 85/80 |
| 3,027,670 | 4/1962 | Kramer et al. | 151/41.75 |
| 3,226,145 | 12/1965 | Goldberg | 151/41.75 |
| 3,375,749 | 4/1968 | Coldren et al. | 85/80 |

Primary Examiner—Edward C. Allen
Attorney, Agent, or Firm—Carl E. Johnson; Vincent A. White; Richard B. Megley

[57] ABSTRACT

A releasable fastener for anchoring a workpiece on a threaded member is of hollow configuration and has opposed resilient wing portions deflectible inwardly. The clip is applied to the threaded member by push-on action and may initially have been formed from sheet metal. The configuration of the clip and its deflectible wing portions is such as to accommodate dimensional variation in production of the workpieces to be assembled. One field of use for the clip is in automotive bumper strip mounting.

2 Claims, 6 Drawing Figures

RETAINER CLIP

BACKGROUND OF THE INVENTION

A variety of retaining devices have been designed for special purposes. Many have taken the form of sheet metal clips which may be quickly and reliably applied in lieu of bolt and nut type fasteners. A major disadvantage of employing a rotary fastener in certain assemblies for instance, is that there may be inadequate space available for applying the necessary take-up torque whereas a "push-on" type fastener can conveniently and rapidly effect securement of the parts of the assembly.

An illustrative situation arises in the automotive field. It is often the practice to provide each steel bumper with a longitudinal strip of resilient protective material such as rubber or plastic for absorbing light concussion. This resilient strip material commonly is molded in attractive form about a metal core strip provided with longitudinally spaced threaded studs extending through holes formed in the bumper, and nuts have hitherto been threaded onto the respective protruding ends of the studs for anchoring the bumper and its resilient strip in properly assembled relation. Since for better appearance the bumper usually has a configuration substantially conforming to closely adjacent end portions of the vehicle on which the assembly is to be mounted, the non-exposed bolt type mounting necessarily had to be effected after the resilient strip had been secured on the bumper, and could not occur before the resilient strip was assembled to the bumper. Accordingly, the bumper and its strip have been preassembled. But this has occasionally meant, as for instance when the resilient strip was not available, that vehicles from a production line and otherwise complete might have to wait in costly storage; it would of course be preferable to be able to mount the bumper on the vehicle and then be able to mount the bumper strip on the bumper end before or after the bumper is secured to the vehicle thereby enabling production lines to be maintained.

The "push-on" retainer of the present invention is capable of use with threaded members in securing a greater variety of parts. Its generally hollow configuration is adapted to allow the stud to adjust axially to accommodate variations in production. Yet tightness of assembly without relative rotation of the clip and stud or the like, is assured.

SUMMARY OF THE INVENTION

In view of the foregoing, it is an object of this invention to provide an improved non-rotary or push-on type fastener cooperative with a threaded member to releasably hold workpieces assembled.

Another object of the invention is to provide a one-piece adaptable clip for convenient and rapid take-up action with a threaded stud.

A further object of the invention is to provide a sheet metal fastener of non-circular section for adjustable axial retention on a threaded stud by means of opposed, resilient wing portions.

To these ends, and as herein shown, the invention comprises a push-on clip adapted to be axially received by the free end of a threaded member projecting through a hole in a workpiece, the clip including opposite side portions adapted to engage the wall of the hole, both of the side portions being axially slotted to define cooperative resilient wing portions, respective ends of the side portions being yieldingly spreadable into thread engaging relation with the member, one of the wing portions having a free end biased outwardly from the member for yieldingly bearing on the wall of the hole, and the other of the wing portions having its free end out-turned for axial abutment with the workpiece. As herein shown the retainer clip is noncircular, its opposite side portions having transverse dimension greater than the diameter of the cooperative threaded stud to guide its adjustable reception in an elongated opening in the workpiece. In accordance with a further feature of the illustrative embodiment, the wing portion providing the axial abutment and retention preferably is twisted about an axis so as to at least partly overlie the workpiece adjacent its hole and the other wing portion yieldingly maintains the twisted wing portion in abutting relation.

While the invention is herein described as being embodied in a sheet metal retainer, it will be appreciated that the fastener may be of plastic or other material if desired.

BRIEF DESCRIPTION OF THE DRAWINGS

The foregoing and other features of the invention will now be more particularly described in connection with an illustrative embodiment and with reference to the accompanying drawings thereof, in which.

DESCRIPTION OF PREFERRED EMBODIMENT

Figure 1:
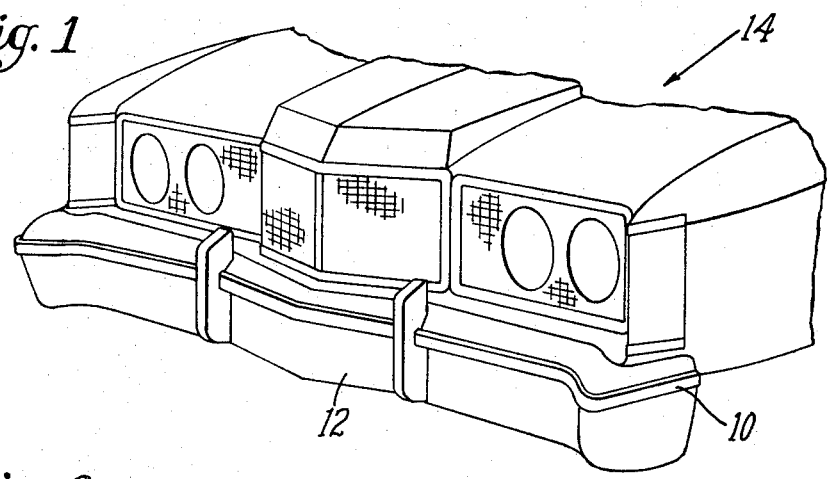
FIG. 1 is a perspective view of the front end of an automobile to which a bumper provided with a bumper strip has been assembled by means of the fastener clip of this invention.

It is desired to secure a first workpiece in assembled relation to a second workpiece having a threaded member extending therefrom and axially projectable through a hole in the first workpiece. More specifically and by way of illustration of the invention, it is desired to be able to affix a bumper strip 10 (FIG. 1) to a vehicle bumper 12 either before the latter has been secured to a vehicle 14 or after the bumper has been mounted. Close conformity of bumper shape to end contour of the vehicle precludes such facility in mounting when rotary fastener means such as nuts and bolts are used. While usage of this invention is not restricted to bumper mounting, a novel fastener clip 16 (FIGS. 3–6) to be described provides a solution to that and numerous other assembly problems.

Figure 5:
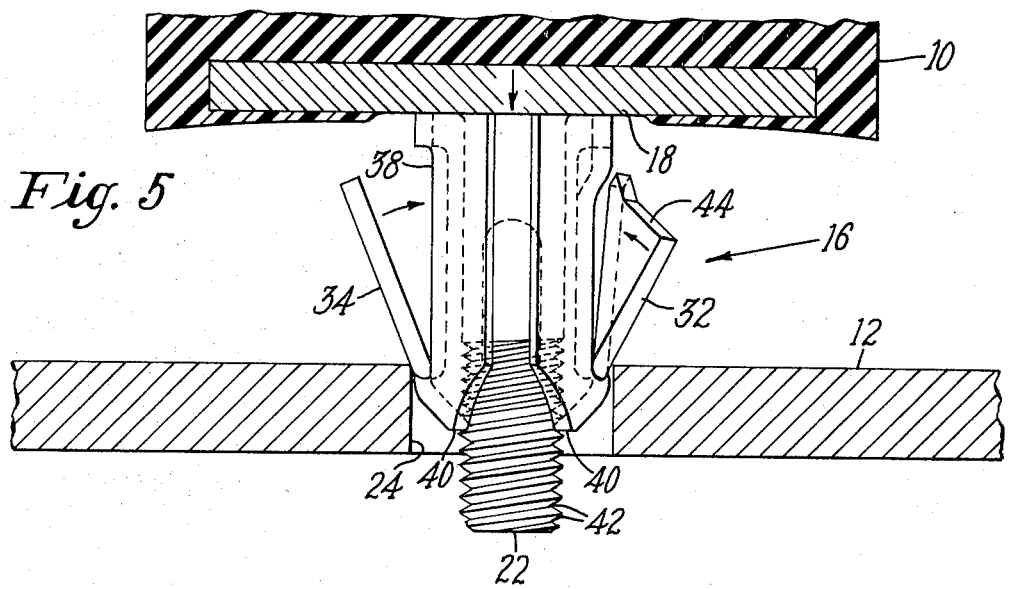
FIG. 5 is a view in side elevation of the clip shown in FIG. 4 when turned 90° about the stud axis, workpieces such as a bumper and bumper strip being shown in section and positioned for assembly, the stud being affixed to the bumper strip as by welding.
Figure 6:
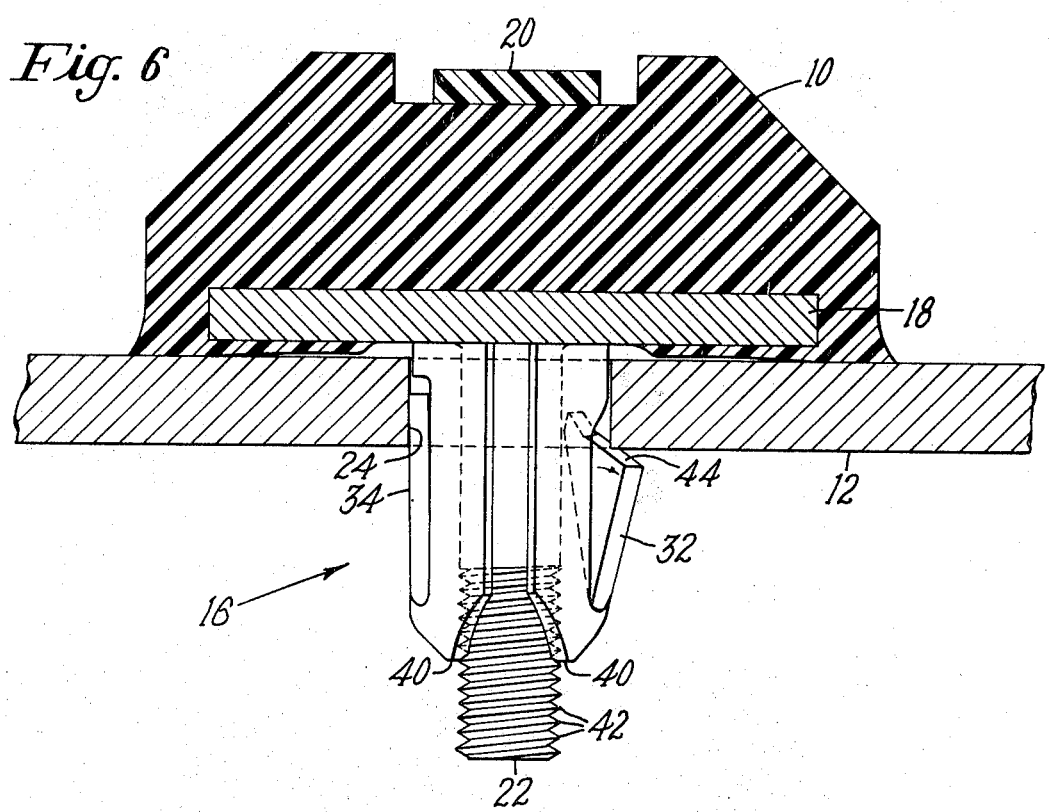
FIG. 6 shows the clip of FIG. 5 when it has releasably locked the parts in assembled relation.

For absorbing lesser concussion than encountered in serious accidents, the bumper strip 10 is generally of rubber or resilient plastic material that is molded about a longitudinal metal core strip 18 (FIGS. 5 and 6). As shown in FIG. 6 a decorative trim strip 20 of contrasting color may be integral with or bonded to the strip 10. At spaced intervals along its length threaded studs 22 are secured as by end welding to the core strip 18 and respectively have their free ends projecting through holes 24 formed in the bumper 12. Preferably the holes 24 are elongated widthwise of the vehicle to allow for production variations. The retainer clips 16 must be thrust axially onto the studs 22, respectively, of the bumper strip 10 prior to assembly of the strip to the bumper 12.

Figure 2:
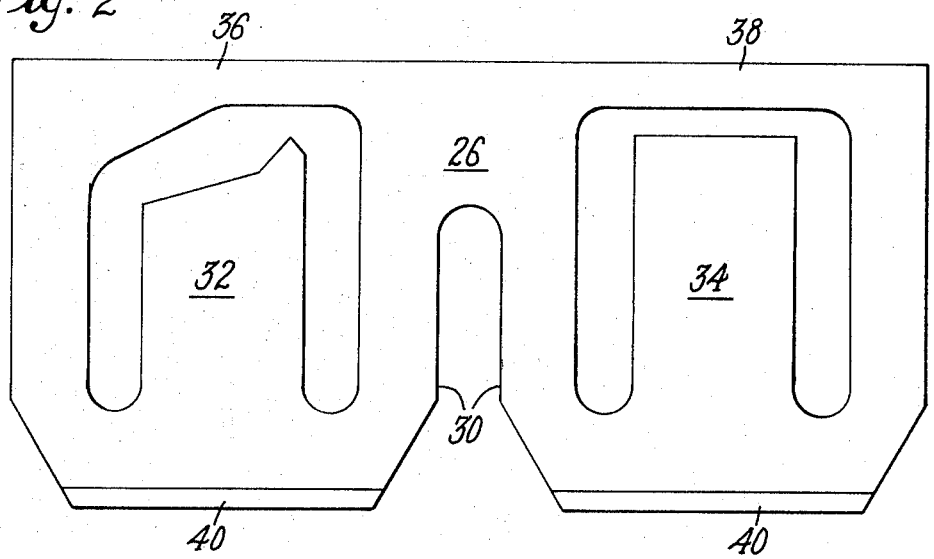
FIG. 2 is a plan view of a sheet metal blank from which the clip is formed.
Figure 3:
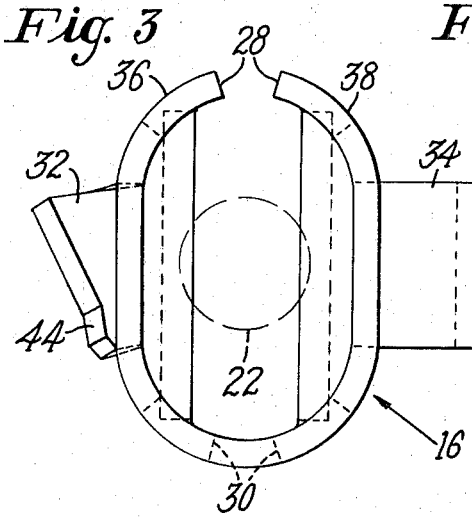
FIG. 3 is a bottom view of the clip when formed, a threaded mounting member or stud being indicated by dash lines.

The clip 16, when of sheet metal, may be produced by die cutting to provide a blank 26, for instance as shown in FIG. 2. The blank 26 is further formed by bringing its ends together and thus providing a hollow body preferably non-circular in sectional shape as shown in FIG. 3. Accordingly, one end portion may be open as at 28, and the other end is partly open due to a slot 30 (FIGS. 2 and 3) previously formed midway of the blank 26 to facilitate shaping the clip 16 with hollow, elongated configuration. The die cut also provides, as shown in FIGS. 2–6, a pair of opposite, generally rectangular wing portions 32, 34 disposed, respectively, in the longer and wider side portions 36, 38 of the clip. The latter are yieldingly spaced apart only slightly less than the distance between longer walls of the holes 24 intended adjustably to guide and receive the studs 22. Edges of free ends 40, 40 (FIGS. 5 and 6) of the side portions 36, 38 are coined (or trimmed to provide a sharp edge and) turned inwardly providing maximum grip on the stud threads 42.

Figure 4:
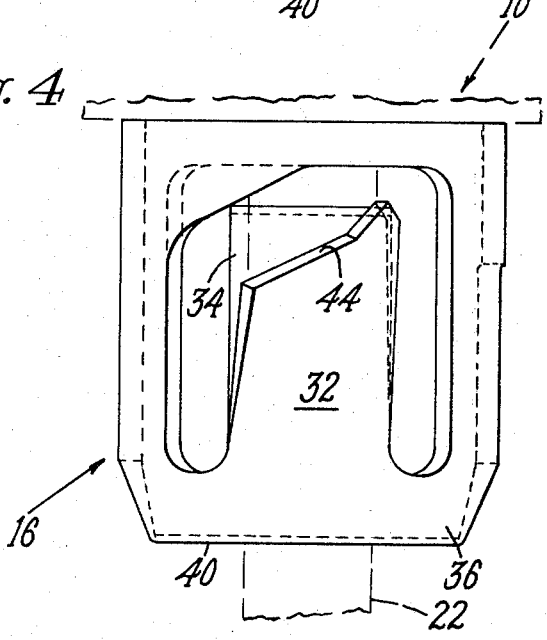
FIG. 4 is a view in side elevation of the clip shown in FIG. 3.

For reasons hereinafter explained, the wing portions 32, 34 when in their inoperative, unstressed positions (as shown in FIGS. 3–5) are inclined outwardly from their respective junctions with the side portions 36, 38. The initial angle of inclination relative to the stud axis as indicated in FIG. 3 is preferably approximately the same (roughly about 30°) for both wing portions. The essential relation is that the free ends of the wings are initially spaced apart more than the minor diameter or lesser dimension of the hole 24. While the inwardly deflectible wing portion 34 is substantially flat to act as a pressure finger engageable with one side wall of the bumper hole 24 as shown in FIG. 6, the opposite side wing portion 32 is twisted (about an axis substantially parallel to that of the stud) to at least partly overlie the bumper 12 adjacent its hole 24. Accordingly, the twisted wing 32 has its free end partly slabbed off to provide a locking shoulder as at 44 (FIGS. 2, 4–6) for radial and axial abutment with the bumper as shown in FIG. 6.

Usage of the clip 16 in assembling the bumper strip 10 to the bumper 12, for instance, will now be briefly described. The clip or clips 16 will first have been thrust axially onto the free ends of the studs 22, respectively, as shown in FIG. 5. The side portions 36, 38 are then yieldingly spread apart by the stud to allow the gripping edges 40, 40 to ride over the threads 42. Now the clip 16 and bumper strip 10 is assembled for fitting to the exterior of the bumper 12 (whether the bumper itself is on the vehicle or detached), each stud having its threaded free end accommodated in and received through an appropriate elongated bumper hole 24. As the bumper strip with assembled clips is relatively moved lengthwise of the studs with respect to the bumper, i.e., from the position shown in FIG. 5 to that shown in FIG. 6, the opposed wing portions 32, 34 are cammed inwardly by the walls of the holes 24 until the locking shoulder 44 of the twisted wing 32 emerges from the hole and snaps outwardly into axial bumper abutting relation thus to hold the parts assembled. The wing portion 34 in bearing on the opposite side wall of the hole 24 provides the pressure to hold the twisted wing 32 in position to retain the strip and bumper assembled, and simultaneously insures that the coined edges 40, 40 grip the threads 42 at the proper point along their axial length with maximum retention.

While the bumper and its strip are now firmly assembled, and this can be accomplished by means of the clip 16 whether the bumper 12 be on the vehicle or detached therefrom, each clip can be readily released from its operating position for purposes of disassembly. For this purpose a simple tool such as a manual screw driver can apply pressure to inwardly deflect the twisted wing 32 toward the stud against the influence of the radially acting pressure wing 34. When the wing shoulders 44 are thus freed from the axially abutting relation with the bumper 12, the strip assembly 10 may be removed.

It will be understood that in numerous other applications of the clip 16 it may be used singly. In each case the clip affords an axial adjustment, good holding power, and convenient releasability from securing an apertured workpiece to another workpiece having an integral threaded member for receiving the clip.

Having thus described my invention, what I claim as new and desire to secure by Letters Patent of the United States is as follows:

1. A one-piece push-on type clip for securing a non-rotatable threaded stud in axial relation to a workpiece having an elongated hole for receiving the stud endwise, the clip comprising a hollow non-circular body of sheet metal partly open at one end and wholly open at the other end and having oppositely disposed resilient side portions laterally extending between said ends, said side portions being spaced apart by slightly less than the lesser dimension of said hole, each of said side portions being coined with a generally straight edge to cooperatively grip a locality of the threads of the stud, and each of the side portions when unstressed having an outwardly inclined resilient wing portion divergent substantially from the thread engaging locality, free ends of the wing portions being spaced apart more than the lesser dimension of said hole, one of the wing portions being arranged to be cammed inwardly by a side wall of the hole and the other of said portions being formed with a combination axial and radial take-up and locking shoulder arranged to be urged into partly overlapping abutment with the workpiece adjacent to another side of the hole by radial pressure exerted by said one wing portion in reaction to its engagement with said side wall of the hole.

2. A clip as in claim 1 wherein one of the wing portions is flat and the other of the said wing portions is partly twisted to extend more than the lesser dimension of said hole from the unstressed flat wing portion and about an axis nearly parallel to that of the stud, and the workpiece engaging surface of said shoulder is inclined to said axis to partly extend into said hole.

* * * * *